United States Patent [19]

Krötz et al.

[11] 4,361,957

[45] Dec. 7, 1982

[54] PNEUMATIC HAND TOOL WITH VACUUM DEBRIS REMOVAL

[75] Inventors: Hermann Krötz, Murrhardt-Steinberg; Robert Klenk, Grosserlach-Schönbronn, both of Fed. Rep. of Germany

[73] Assignee: Robert Bosch GmbH, Stuttgart, Fed. Rep. of Germany

[21] Appl. No.: 227,533

[22] Filed: Jan. 22, 1981

[30] Foreign Application Priority Data

Feb. 16, 1980 [DE] Fed. Rep. of Germany ....... 3005860

[51] Int. Cl.$^3$ .............................................. B26B 15/00
[52] U.S. Cl. ........................................ 30/124; 83/100; 408/58
[58] Field of Search ................ 30/124, 128, 41.5, 133, 30/241; 51/273; 83/100; 408/58

[56] References Cited

U.S. PATENT DOCUMENTS

| | | | |
|---|---|---|---|
| 3,785,092 | 1/1974 | Hutchins | 51/273 X |
| 3,824,745 | 7/1974 | Hutchins | 51/273 X |
| 3,850,254 | 11/1974 | Hirdes | 408/58 X |
| 3,932,963 | 1/1976 | Hutchins | 51/273 X |
| 4,037,982 | 7/1977 | Clement | 51/273 X |
| 4,124,956 | 11/1978 | Levinson | 51/273 |
| 4,209,069 | 6/1980 | Smith | 408/58 |

*Primary Examiner*—Jimmy C. Peters
*Attorney, Agent, or Firm*—Frishauf, Holtz, Goodman & Woodward

[57] ABSTRACT

To remove, by suction, chips and debris arising in operation of a hand-cutting tool, for example a sheet-metal nibbling tool, a saber saw, or the like, an ejection nozzle is surrounded by a preferably plastic body defining, internally a Venturi, and externally of the ejection nozzle a vacuum, underpressure or suction chamber which is connected through a preferably flexible hose to a suction pick-up nozzle, removably attached adjacent a reciprocating tool at the working or cutting head of the tool. The suction pick-up nozzle preferably includes a chamber in direct air communication with the tool so that chips which arise in tool operation are directly drawn into the pick-up nozzle for removal, by air flow suction, through the suction duct and to a collecting and disposal hose.

20 Claims, 3 Drawing Figures

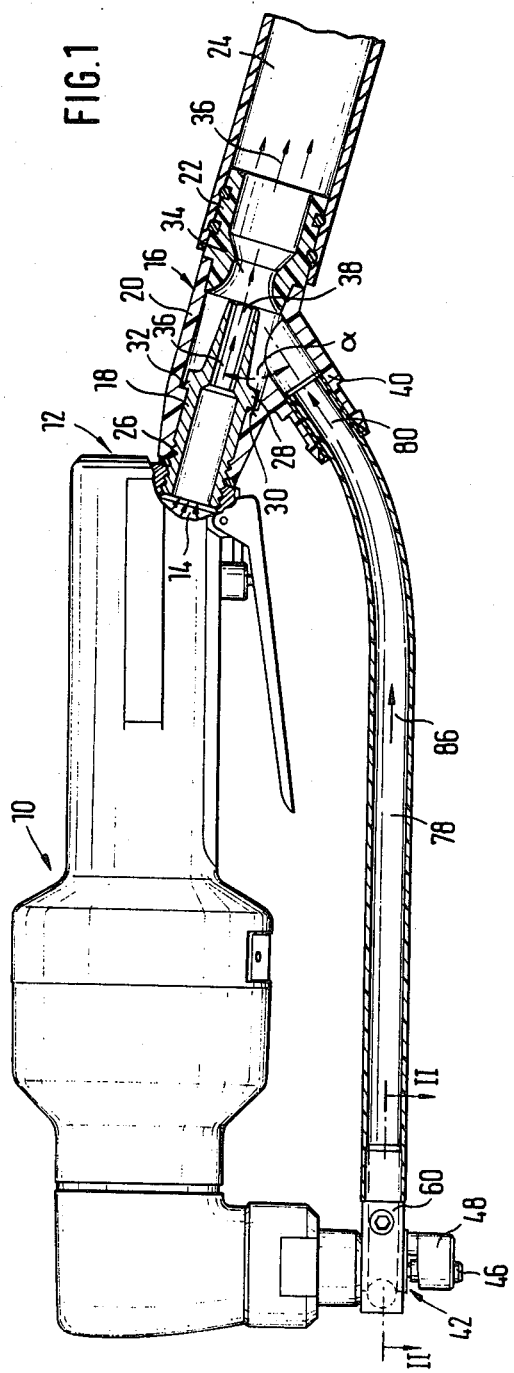
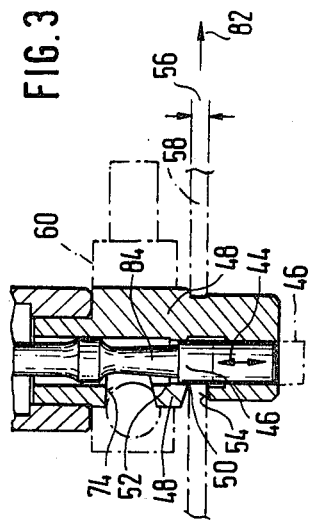
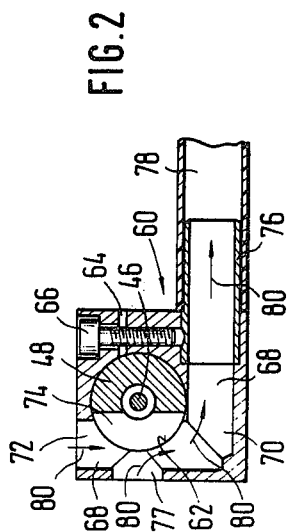

PNEUMATIC HAND TOOL WITH VACUUM DEBRIS REMOVAL

The present invention relates to hand tools, and more particularly to a compressed-air hand tool which is combined with a debris or chip removal suction device.

BACKGROUND

Various types of hand tools, and particularly metalworking hand tools, are known in which chips or cutting debris result in operation of the tool. Chips, particularly sheet-metal chips, splinters, and the like, usually have sharp edges which can cause injury to the operator and other persons, particularly if the chips, splinters, and other sheet metal bits and pieces are lying about at random surrounding the work area. Chips and splinters, spirals, and the like, which arise upon cutting and which fall on the floor, cause the additional danger that they can embed themselves in the soles of shoes, particularly rubber soles. This substantially increases the danger of slipping, and thus further work accidents.

It has previously been proposed to provide suction devices close to or adjacent the work head of electrically operated saber saws, rotary hand saws, and the like, in order to remove wood chips and sawdust. Usually, such wood chips or sawdust are collected in collection bags.

THE INVENTION

It is an object to provide a pneumatically—typically compressed-air — operated hand tool which is combined with a debris removal device, which can be in form of an attachment, to remove metal chips without, preferably, requiring any additional power.

Briefly, a vacuum injection nozzle is connected to the exhaust port of the tool, and cooperating with a Venturi, to provide a suction zone in advance of a pneumatic outlet duct. The suction zone is connected to a suction duct which, in turn, is connected to a suction nozzle positioned adjacent the cutting head of the pneumatic tool. The exhaust duct downstream of the Venturi thus will carry along chips which are sucked up from the tool suction nozzle, carried through the suction duct and transported through the outlet or exhaust duct of the tool for collection in a suitable receptacle.

Preferably, the suction nozzle is a clamp-on unit which can be attached to the tool adjacent the cutting head thereof; the injection nozzle, together with the Venturi, can be in form of an attachment arranged for screw connection to the exhaust port of the tool, so that the vacuum chip removal system can be applied to already existing tools.

The system is particularly applicable to sheet-metal nibbling tools, and tools of the type having a reciprocating cutting head, such as saber saws, but is generally useful with any pneumatic tool, especially hand tools which have a chip-generating tool bit, grinders, polishers, sanders, and the like, both for ferrous and non-ferrous metal, as well as for wood, plastic and other work materials.

The tool has the advantage that the nozzle, coupled to the exhaust port of the tool, itself generates the necessary suction, so that no additional energy-consuming apparatus or attachment need be used, nor are any other connecting elements required to provide energy to the chip removal feature of the tool; the chips or debris are removed directly over the exhaust port to a collecting station through exhaust ducts which, usually, are either present or can run closely adjacent to pneumatic supply hoses. In addition to removing chips, any further contaminants, such as excess cutting oil, etc., are also removed from the immediate vicinity of the cutting head so that the actual operating position of the cutting head on the workpiece will be kept clean, and any guide markers will be clearly visible.

DRAWINGS

FIG. 1 is a part-sectional, part-pictorial view of a pneumatic sheet-metal nibbling tool with the chip or debris removal device attached thereto;

FIG. 2 is a sectional view through line II—II of FIG. 1; and

FIG. 3 is a greatly enlarged sectional view of the cutting head of the tool of FIG. 1.

The invention will be described in connection with a sheet-metal nibbling tool, in which a reciprocating cutting head cuts a strip from a metal sheet.

A sheet metal tool 10 has a housing, adapted for connection to a source of compressed air, that is, formed with a compressed air inlet 12 at one end thereof. The housing is formed with an exhaust port 14 to exhaust air from the cutting tool. The exhaust port 14 is connected to an exhaust fitting 16. The fitting 16 includes a flow-constricting nozzle 18 which cooperates with a Venturi to generate a suction zone. The constriction nozzle 18 is included in a two-part body consisting of parts 20, 22 joined together, and preferably made of plastic, for example as injection molded element. Part 22 can be connected to an exhaust hose 24 which can terminate in a collection vessel or bag to collect chips from the tool, while permitting escape of air, for example a collecting bag having the characteristics of a vacuum cleaner bag.

The exit port 14 of the housing 10 is formed with a thread, and the nozzle 18 is screwed with a threaded extension 26 into the thread defining the port 14. The nozzle 18 has a circumferential shoulder 28 at the intermediate range thereof, which is formed with an edge 30 cooperating with a counter edge 32 of the part 20. Thus, when assembling the part 20 against the housing, for example with an intermediate sealing ring, and screwing the nozzle 18 into the housing 10, the first part 20 of the suction attachment is likewise attached to the housing. The second part or terminal part 22, for example attached by an additional thread, by an adhesive, plastic welding, or the like, is formed with a constriction 34 to form a Venturi. The constriction 34 is located downstream behind the end 38 of the nozzle 18. The flow direction of exhaust air is shown by arrows 36.

A suction stub 40 is formed on the first part 20 of the suction attachment, having an exit opening positioned just upstream of the end 38 of the nozzle 18. Looked at in the direction of air flow—see arrows 36—the terminal end of the stub 40 is placed in advance of the Venturi 38 of the exhaust duct 16. The suction stub 40 is so arranged that its axis forms an acute angle $\alpha$ with the longitudinal axis of the constriction nozzle 18. The arrangement thus provides for an effective ejection nozzle positioned within the exhaust hose or duct 16. In operation of the tool 10, exhaust air 36 is collected and constricted by nozzle 18 and ejected into the exhaust duct 16, thus generating a vacuum or an underpressure within the stub 40.

The working head of the tool 10 is positioned at the side opposite the air supply and exhaust. A working head 42—see particularly FIG. 3—has a cutting punch 46 which reciprocates in the direction of the double-arrow 44. The cutting punch 46 is operable in a guide sleeve 48. The guide sleeve 48 has a cutter edge 50. In operation, a cutter edge 52 of the punch 46 passes the cutter edge 50. The guide sleeve 48 has an additional notch 54 which is wider than the thickness 56 of the workpiece 58, typically a sheet of metal. The width of the notch 54 defines the cutting capacity of the tool. A pick-up nozzle 60—see FIG. 1—is attached to the guide sleeve 48. The nozzle body 60, as best seen in FIG. 2, has an attachment hole 62 so that it can be fitted directly on the guide sleeve, and clamped thereon. A slit 64 is formed in the nozzle body 60 to receive a clamping screw 66, passing through the body and being tapped at the other side of the slit 64 in the body 60. Thus, the body 60 can be clamped on the guide sleeve 48. The pick-up nozzle body 60 has an internal, angled duct 68 which is open at both ends. Duct or bore 68 is located in one plane, transverse to the axis of the attachment hole 62. One leg of the angled duct 68 is tangent to the hole 62; the other leg 72 of the bore 68 is tangent to the axis of the bore 62. The arrangement, when assembled to the guide sleeve 48, is so oriented with respect to the working stroke—see double arrow 44—of the punch 46 (FIG. 3) that the intersection of the leg 72 with the bore 62 is in the range of a relief or cut-out 74 in the sleeve 48, and positioned above the notch 54 for the workpiece 58. The cut-out 74 is substantially larger than the notch for the workpiece—compare FIGS. 2 and 3.

The pick-up nozzle 60 has, additionally, a side ventilating opening 77. The side opening 77 also functions as an ejection opening for chips generated by the tool 42 if, for some inadvertent reason, the suction duct system 40-78-68 should be plugged. The additional ejection opening thus prevents damage or possible breakage of the tool 42.

One of the legs 70 of the angled bore 68 continues in form of an attachment stub 76 to which a connecting duct or hose 78 is attached. The other end of hose 78 is connected to the suction stub 40 of the attachment element 20, 22. The suction stub 40, together with the hose 78 and the angled bore 68, and the side air opening 77 as well as the terminal 72, forms a complete suction path which extends from the upper region of the workpiece 58 in the range of the cooperating cutting edges 50, 52 of the guide sleeve and the punch of the tool, respectively. No additional opening is provided besides the termination of the bore 68 and the side vent opening 77 for the suction duct system 40-78-68. The guide sleeve opening 74 can be considered to be a partial enlargement of the leg 72 of the angled bore 68.

Operation: Upon application of compressed air to the inlet opening 12, exhaust air, under some residual pressure, will be ejected through the outlet opening 14. Thus, due to air flowing in the direction of the arrows 36 (FIG. 1), a partial vacuum or underpressure will result in the suction duct system 40-78-68, resulting in suction air flow in the direction of arrows 80 (FIG. 2), 86 (FIG. 1). The tool punch 46 will reciprocate as shown by the double arrow 44. When the punch 46 is in the bottom dead center position (as shown in chain-dotted lines in FIG. 3), the workpiece 58 is pushed in the direction of the arrow 82 until the sheet comes to lie with its edge at the abutment portion of the cutting punch 46. Prior to downward movement and subsequent thereto, the stem or plug-like extension of the tool closes off the opening formed by notch 54. Upon upward travel of the cutting punch 46, the cutter edge 52 cuts a sickle-shaped chip from the workpiece sheet 48 by cooperation with the cutter edge 50 on the guide sleeve 48. The chip is thrown upwardly by the cutter edge into the area of the nozzle body 60 and will reach the enlargement of the leg 72 of the bore 68 in the opening 74 formed in the guide sleeve 48. When the chip has reached the bore 68, the suction air—see arrow 80—will carry it along and transport it together with suction air into the hose 24, for further removal to a collecting point or container. Air access to bore 68 from notch 54 is impeded by the tool 46 itself. No chips will be loose or fall away from the tool, so that the working region will be free of loose chips and no danger to the operator or other personnel, from the sharp sheet-metal chips or splinters, will result, The system of the present invention is useful not only for sheet-metal cutters and nibbling tools, but can be used, to advantage, in any pneumatically operated hand tool in which workpiece removal is done, such as saws, scroll and saber saws, grinders, and the like.

Various changes and modifications may be made within the scope of the inventive concept.

The system of the present invention, forming the exhaust nozzle 18, the parts 20, 22 which include the Venturi cooperating therewith and providing an attachment to an exhaust hose 24, as well as the workpiece chip suction head 60 and the connecting duct 78 can be applied as an attachment to already existing tools, particularly if they are already supplied with a thread so that the nozzle element 18, with its threaded projection 26, can be screwed thereinto. Of course, a smooth outlet can be subsequently tapped. The system, therefore, can be used as a retrofit attachment applied to existing tools.

The invention can also be applied to various types of electrically operated hand tools, in which the electric drive motor includes a fan or other pneumatic air-conveying device, so that a stream of air is generated which is available at an outlet, corresponding to the outlet port 14, FIG. 1. The invention, thus, is not limited to pneumatically operated tools, but can be applied anywhere where a stream of air of sufficient strength to provide suction for removal of chips, debris, or sawdust from a cutting operation immediately adjacent the cutting tool is desired. For example, the suction pick-up head 60 can be placed immediately adjacent the reciprocating head of a saber saw to remove sawdust or cut chips when cutting through wood, plastic, or metal.

We claim:

1. Chip generating, pneumatically operated hand tool, especially sheet metal nibbling tool, with vacuum chip removal device, especially to remove metal chips, comprising a tool housing (10);

a compressed air inlet (12) to supply operating compressed air to the tool;

a cutting head (42) mounted on the tool housing and having a reciprocating cutting tool (46) thereon, and receiving operating power from compressed air supplied to the inlet;

an exhaust port (14) formed in the tool housing from which a stream of flowing air is being ejected in operation of the tool, a vacuum injection nozzle (18) pneumatically connected to the exhaust port;

means (20, 22, 34, 40) defining a Venturi and a suction or underpressure chamber;

a suction duct (78) connected to the suction or underpressure chamber to have suction applied thereto;

and a suction nozzle (60) positioned adjacent the cutting head (42) of the tool and pneumatically connected to said suction duct to remove cutting chips or debris arising in cutting operation of the tool for transport, by pneumatic suction, from the nozzle through said suction duct to the suction or underpressure chamber for removal through a removal duct or hose (24);

wherein the suction nozzle comprises a nozzle (60) and a suction duct (68) formed therein;

and the cutting head (42) includes a guide element (48) surrounding a portion of the cutting element (46) of the tool, extending inside the nozzle body and being in pneumatic communication with said suction duct (68) to transport chips and debris arising in cutting during reciprocating action of the cutting element and transported by the cutting element into the nozzle body for removal by suction by the suction duct.

2. Tool according to claim 1, wherein the means defining the Venturi and suction or underpressure chamber and said injection nozzle (18; 20, 22, 34, 40) comprise a subassembly separably connected to the tool housing and positioned in an outlet air duct therefrom.

3. Tool according to claim 2, wherein said means (20, 22, 34, 40) defining the Venturi and suction or underpressure chamber comprises two separate parts (20, 22) connected together, one of said parts (20) being positioned adjacent the injection nozzle, and the other of said parts (22) including a constriction defining said Venturi.

4. Tool according to claim 2, wherein said injection nozzle (18) has an end portion (38) of a cross section which is small with respect to the cross section of the exhaust air port (14) of the tool.

5. Tool according to claim 2, wherein the terminal portion (38) of the injection nozzle (18) is positioned in the region of the constriction of the Venturi (34).

6. Tool according to claim 2, wherein the ejection nozzle (18) is formed with a threaded extension (36), the threaded extension being threaded into the exhaust port (14) of the tool.

7. Tool according to claim 2, wherein the ejection nozzle (18) is formed with a threaded extension (26); said means (20, 22, 34, 40) defining the Venturi and suction or underpressure chamber comprises a sleeve-like element surrounding the nozzle (18), the sleeve-like element and the nozzle being formed, respectively, with interengaging abutment-and-shoulder means to permit screwing the nozzle into the exhaust port and, simultaneously, attaching said sleeve-like portion to the nozzle and hence to the tool.

8. Tool according to claim 1, wherein said means (20, 22, 34, 40) defining the Venturi and suction or underpressure chamber comprises a plastic sleeve-like element surrounding said ejection nozzle.

9. Tool according to claim 8, wherein said plastic element is an injection-molded part.

10. Tool according to claim 1, wherein the suction nozzle body (60) comprising clamping means (62, 64, 66) shaped to fit about the cutting head (42) and removably attachable thereto by clamping.

11. Tool according to claim 1, wherein the suction nozzle comprises a nozzle body formed with a projecting connecting stub (76) for attachment of said suction duct (78) thereto.

12. Tool according to claim 1, wherein said vacuum injection nozzle; said means defining the Venturi and the suction or underpressure chamber; the suction duct (78) and the suction nozzle (60) comprise a subassembly separable from the pneumatic tool.

13. Tool according to claim 1, wherein the guide element comprises a guide sleeve (48) formed with an opening (74) therein, the opening in the guide sleeve being in pneumatic communication with said suction duct and with the cutting element (46).

14. Tool according to claim 13, wherein the tool is a sheet-metal cutting tool having a reciprocating punch (46) formed with a cutting edge (52) cooperating with the stationary cutter edge (50) formed on the guide sleeve, the punch reciprocating in said sleeve;

and wherein the opening in pneumatic communication with the air duct (68) in the suction nozzle (60) is in pneumatic communication with said cutting edges.

15. Tool according to claim 14, further including a secondary air relief opening (77) positioned adjacent the cutting edges to permit ejection of chips if the duct should be clogged, and to provide for an additional air opening to the duct.

16. Tool according to claim 14, wherein said tool is a sheet-metal nibbling or cutting tool.

17. Tool according to claim 14, wherein the punch comprises a sheet metal access opening (54) formed in the sleeve, and includes a stub element positioned to cyclically close off said access opening upon reciprocation of the punch to establish a vacuum connection with the vacuum source and close off the access opening from communication with ambient air to enhance the chip removal effect of vacuum within the suction nozzle body (60).

18. For combination with a compressed air, reciprocating hand tool having a tool housing: a reciprocating cutting head (42) mounted on the tool housing, and an air exhaust port (14) formed on the tool housing from which, in operation of the tool, a stream of air emanates, a vacuum debris removal apparatus comprising, in accordance with the invention, a vacuum ejection nozzle (18);

means (20, 22, 34, 40) defining a Venturi and suction or underpressure chamber for cooperation with said vacuum ejection nozzle;

a suction duct (78) connectable to the suction or underpressure chamber to have suction applied thereto in operation of the tool;

and a suction nozzle (60) positionable to surround a portion of the reciprocating cutting head (42) of said tool and connectable with said suction duct (78), said vacuum injection nozzle having means (26) for attachment of the nozzle to a tool to place the nozzle into air flow communication therewith, the suction nozzle (60) comprising a nozzle body having means (62, 64, 66) for attachment of said suction nozzle to a tool and surrounding the cutting head thereof.

19. For combination with a sheet metal nibbling tool, the vacuum debris removal apparatus of claim 18, wherein the suction nozzle includes a guide sleeve (48) formed with an opening therein which is in pneumatic communication with the suction duct (78) and with a portion (46) effecting cutting of sheet metal and forming a cutting element and part of the cutting head (42) to remove, by suction, chips generated in the operation of the nibbling tool and transported from a cutting position (50) to said opening for subsequent removal by vacuum.

20. Tool according to claim 19, wherein the punch comprises a sheet metal access opening (54);
the cutting element (46) includes a stub extension cyclically closing off said access opening upon reciprocation of the punch to establish a vacuum connection between the vacuum source which is closed off from communication with ambient air through the access opening upon movement of the cutting element and said stub element across the sheet metal access opening.

* * * * *